(12) United States Patent
Pravetz (10) Patent No.: US 8,166,393 B1
(45) Date of Patent: *Apr. 24, 2012

(54) DYNAMIC PREVIEW OF ELECTRONIC SIGNATURE APPEARANCE

(75) Inventor: James D. Pravetz, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1005 days.

This patent is subject to a terminal disclaimer.

(21) Appl. No.: 12/112,960

(22) Filed: Apr. 30, 2008

Related U.S. Application Data (63) Continuation of application No. 10/072,382, filed on Feb. 6, 2002, now Pat. No. 7,395,503.

(51) Int. Cl.
*G06N 3/00* (2006.01)
(52) U.S. Cl. ........................................ 715/268
(58) Field of Classification Search ............... 715/234, 715/243, 254, 268, 863
See application file for complete search history.

(56) References Cited

U.S. PATENT DOCUMENTS

| | | | |
|---|---|---|---|
| 5,623,637 A | 4/1997 | Jones et al. | |
| 5,724,423 A | 3/1998 | Khello | |
| 5,818,955 A | 10/1998 | Smithies et al. | |
| 5,917,913 A | 6/1999 | Wang | |
| 5,948,103 A | 9/1999 | Fukuzaki | |
| 6,064,751 A | 5/2000 | Smithies et al. | |
| 6,233,565 B1 | 5/2001 | Lewis et al. | |
| 6,654,009 B2 | 11/2003 | Rubin | |
| 6,751,780 B1 | 6/2004 | Neff et al. | |
| 6,873,715 B2 | 3/2005 | Kuo et al. | |
| 7,395,503 B1 | 7/2008 | Pravetz | |
| 2003/0062202 A1 | 4/2003 | Parry | |
| 2004/0205534 A1 | 10/2004 | Koelle | |

OTHER PUBLICATIONS

Adobe Systems Incorporated, "User Guide Adobe Acrobat 4.0," Chapter 14, pp. 229-245, published by Adobe Systems Incorporated, Copyright © 1999.
Communication Intelligence Corporation, "Sign-it® for Word Version 3.1 User Guide," pp. 1-17, http://www.ecomaus.com/Support/Manuals/SignitWord31/SignitWord.html, Aug. 2001.
Andrea Steller, "CIC Introduces Sign-it 2.0 for Adobe Acrobat," pp. 1-4, http://www.planetpdf.com/mainpage.asp?webpageid=521, Dec. 1999.
Kim Wimpsett, "CIC Sign-it," pp. 1-2, http://www.cnet.com/software/0-806183-8-3936724-13.html, Dec. 12, 2000.
Microsoft Corporation, "Microsoft Knowledge Base Article—Q288985, XL2002: About Digital Signatures in Excel Workbooks," pp. 1-4, http://support.microsoft.com/default.aspx?scid=kb;en-us:Q288985, Feb. 12, 2001.

(Continued)

*Primary Examiner* — Kyle Stork
(74) *Attorney, Agent, or Firm* — Fish & Richardson P.C.

(57) ABSTRACT

Methods and apparatus, including computer program products, implementing and using techniques for signing an electronic document, including establishing an electronic signature appearance for an electronic signature, determining a bounding region on the electronic document for the display of the electronic signature appearance, at the time of signing an electronic document, previewing the electronic signature appearance in the bounding region and signing the electronic document with an electronic signature, the electronic signature associated with the electronic signature appearance. The electronic signature appearance can be configured at the time of signing the electronic document.

29 Claims, 3 Drawing Sheets

OTHER PUBLICATIONS

Microsoft Corporation, "Microsoft Knowledge Base Article—Q307731, How To: Add a Digital Signature to a Custom Macro Project in an Office XP Program," pp. 1-2, http://support.microsoft.com/default.aspx?scid=kb;en-us;Q307731, Sep. 12, 2001.

Microsoft Corporation, "Microsoft Knowledge Base Article—Q292838, OL2002: How to Include or Update Digital Signatures in a vCard," pp. 1-2, http://support.microsoft.com/default.aspx?scid=kb;en-us;Q292838, Mar. 13, 2001.

Microsoft Corporation, "Microsoft Knowledge Base Article—Q168726, OLEXP: How to Digitally Sign and Encrypt Messages in Outlook Express," pp. 1-4, http://support.microsoft.com/default.aspx?scid=kb;en-us;Q168726, May 20, 1997.

PenOp Inc., "Products," 30 pages, www.penop.com, downloaded from www.archive.org, archived Jun. 20, 2000.

Microsoft Corporation, Microsoft Word: User's Guide, 1993-1994, Microsoft Corporation, Version 6.0, pp. 112, 212, 214.

Pinkas, Denis, "How to verify Electronic Signatures?", Mar. 7, 2001, Integris, A Bull Company.

Zuckerman, Amy, "Digital Signatures Spark Debate", May 14, 2001, The New York Times on the Web, http://www.nytimes.com/2001/05/14/technology/14SIGS.html?pagewanted=print.

Microsoft® Outlook® 2000, 1999, includes Screenshots from Microsoft® Outlook® 2000, Figures 1-5, and helpt (sic) topic from Outlook, "Create a signature for messages," p. 1.

DYNAMIC PREVIEW OF ELECTRONIC SIGNATURE APPEARANCE

CROSS-REFERENCE TO RELATED APPLICATIONS

This application is a continuation application of and claims priority to pending U.S. application Ser. No. 10/072,382, filed on Feb. 6, 2002, the entire contents of which are incorporated herein by reference.

BACKGROUND OF INVENTION

This invention relates to signing an electronic document.

An electronic signature is created and verified by means of cryptography. Typically, a private key of the signer of an electronic document is used for creating the electronic signature and a public key of the signer is used for verifying the electronic signature. A recipient of the signed electronic document must have the corresponding public key in order to verify that the electronic signature is the signer's.

In a conventional public-private key implementation, an electronic signature is created by using a hash function to compute a result derived from the signed electronic document and the signer's private key. If the signed electronic document changes, then the hash result will also, with an extremely high probability, change. At the time of signing the electronic document, a hash result is computed and then transformed into an electronic signature using the signer's private key. The resulting electronic signature is statistically unique to both the signed electronic document and the private key used to create it. Typically, an electronic signature is attached to or made part of the electronic document and stored or transmitted with the electronic document.

Verification of the electronic signature is accomplished by computing a new hash result using the same hash function used in creating the electronic signature. The signer's public key is then used to verify whether the electronic signature was created using the signer's corresponding private key and whether the newly computed hash result matches the hash result derived from the electronic signature. If the signer's private key was used and the hash results are identical, then the electronic signature is verified. Verification indicates that the electronic signature was created using the signer's private key and that the electronic document was not altered after it was signed.

The term electronic signature will be used to refer to the code derived from the signed electronic document and a given private key. An electronic signature appearance is a visual manifestation of the signer's signature on the electronic document. An electronic signature appearance can include graphic elements and textual elements. For example, the electronic signature appearance can include an image of the signer's handwritten signature and text indicating the date the electronic document was signed. Because an electronic document cannot be altered after it has been electronically signed without invalidating the electronic signature, the signer cannot alter the electronic signature appearance after signing the electronic document. If the signer is not satisfied with the appearance of the electronic signature on the electronic document, then the signer would have to effectively re-sign another copy of the electronic document, using an electronic signature appearance satisfactory to the signer.

SUMMARY

The present invention provides methods and apparatus, including computer program products, for signing an electronic document. In general, in one aspect, the invention features establishing an electronic signature appearance for an electronic signature and determining a bounding region on the electronic document for the display of the electronic signature appearance. At the time of signing an electronic document, the signer of the electronic document previews the electronic signature appearance in the bounding region and signs the electronic document with an electronic signature, the electronic signature associated with the electronic signature appearance.

Implementations of the invention may include one or more of the following. The electronic signature appearance can be configured at the time of signing the electronic document. The electronic signature appearance can be configured by a user, and user input can be received activating controls for controlling textual and graphic elements included in the electronic signature appearance. The controls can include checkboxes, buttons or both. The electronic signature appearance can include textual elements automatically copied from a certificate of the signer.

The preview of the electronic signature appearance can be displayed within the bounding region. The preview of the electronic signature appearance can be displayed in a configuration dialog box within the bounding region, which dialog box can also display the controls for controlling textual and graphic elements. Alternatively, a preview of the electronic signature appearance can be displayed within the bounding region on a display of the electronic document.

Establishing an electronic signature appearance can include receiving user input selecting an electronic signature appearance from one or more existing electronic signature appearances, interacting with a user to create an electronic signature appearance, or receiving an electronic signature appearance pre-configured by an author of the electronic document to be signed.

Determining a bounding region on the electronic document for the electronic signature appearance can include interacting with a user signing the electronic document to establish the bounding region or establishing a bounding region pre-set by an author of the electronic document. An optimal layout of the electronic signature appearance can be determined based on the dimensions of the bounding region. Optimal dimensions of the bounding region can be determined based on the electronic signature appearance.

The invention can be implemented to realize one or more of the following advantages. A signer of an electronic document can preview an electronic signature appearance shown to fit within a user-specified bounding region prior to signing the electronic document. If the signer is not satisfied with the electronic signature appearance, the signer can edit the electronic signature appearance by editing the dimensions of the bounding region or the graphic and textual elements displayed. Also, the signer can create an electronic signature appearance at the time of signing an electronic document and then archive the electronic signature appearance for later use. Alternatively, the signer can create an electronic signature appearance at the time of signing, thus allowing the appearance to be customized for a particular electronic document.

The details of one or more embodiments of the invention are set forth in the accompanying drawings and the description below. Other features and advantages of the invention will be apparent from the description, the drawings, and the claims.

DESCRIPTION OF DRAWINGS

Like reference symbols in the various drawings indicate like elements.

DETAILED DESCRIPTION

Figure 1:
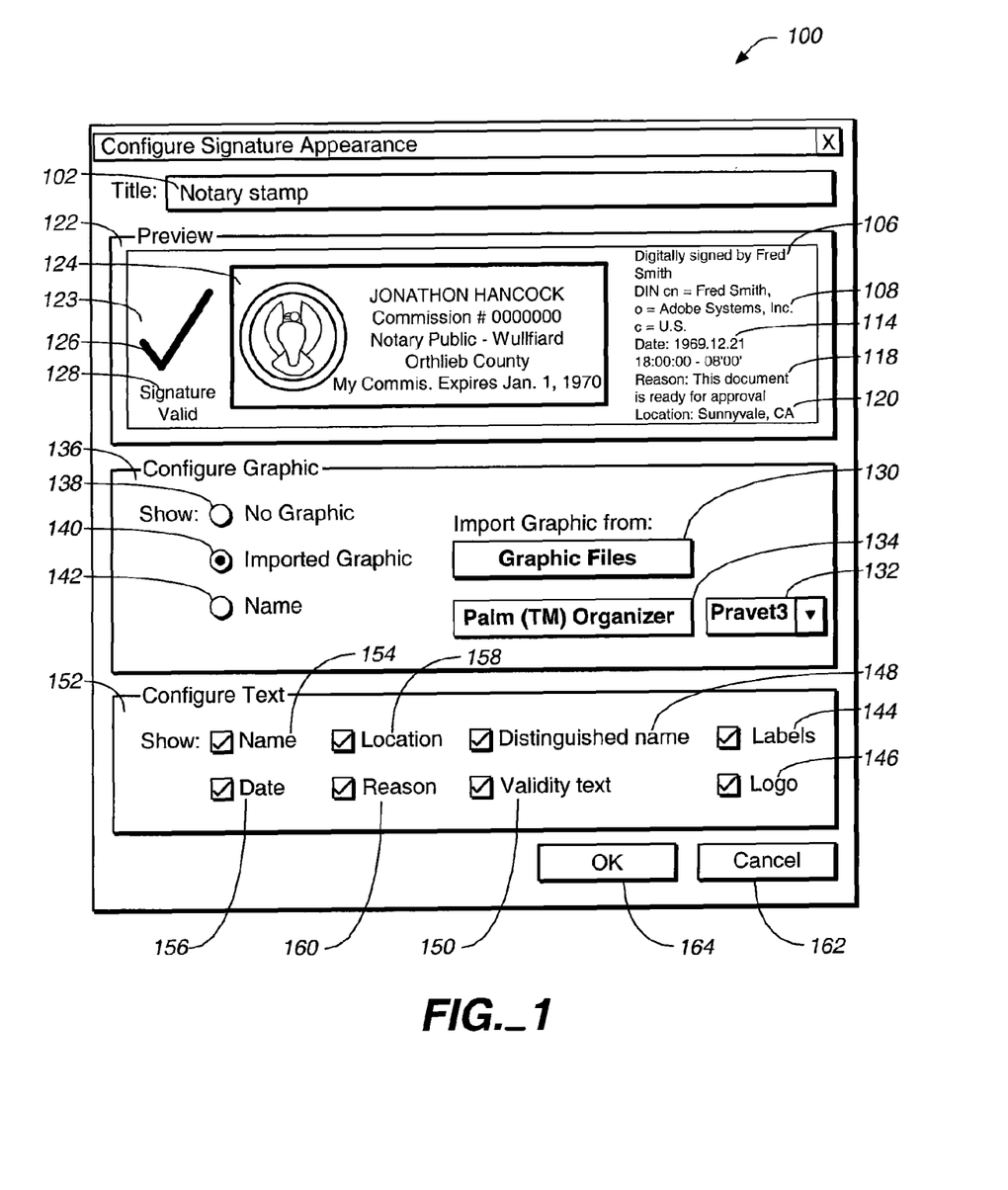
FIG. 1 depicts a computer dialog box for previewing an electronic signature appearance in accordance with the invention.

FIG. 1 shows a configuration signature appearance dialog box 100 displaying a preview of an electronic signature appearance 123 shown to fit within a bounding region, as the electronic signature will be displayed on an electronic document that has been signed. The electronic signature appearance 123 can include a number of textual elements and graphical elements. The elements of an electronic signature appearance can be static or dynamic, as described in further detail below.

Some examples of textual elements that can be included in the electronic signature appearance 123 are described as follows. The electronic signature appearance 123 can include the name of a signer 106 and the date 114 and time 116 the electronic document was signed. Additionally, the electronic signature appearance can include a distinguished name 108 of the signer, which provides further information to identify the signer in addition to the signer's name and can include, for example, an organization the signer belongs to and the country of residence of the signer. The location 120 where the electronic document was signed can be included in the electronic signature appearance in addition to a reason 118 for signing the electronic document. The user can be prompted to input the location 120 and the reason 118 at the time of signing.

An example of a graphical element that can be included in an electronic signature appearance is a graphic of a notary public seal 124, which may be necessary for the signer to meet legal requirements when signing the electronic document.

The electronic signature appearance can also include dynamic validity text 128 and a validity graphic 126, which provide information about the validity of the electronic signature. For example, the validity graphic can be a checkmark if the signature is a valid, a question mark if the validity of the electronic signature is unknown, and an X if the electronic signature is invalid. The corresponding validity text displayed with the validity graphic can be, for example, "signature valid", "validity unknown" and "signature invalid", respectively.

If a user receives a signed electronic document, the user can click on a signature field of the electronic document to validate the electronic signature. For example, in one implementation, the method is performed by an application that maintains a certificate database associated with a user. The user can access a list of trusted certificates contained in the certificate database, which list includes public key certificates of potential signers of signed electronic documents the user expects to receive. If the identity of the signer is verified as being in the user's list of trusted certificates and the version of the electronic document has not been altered since the electronic signature was applied, then the electronic signature is validated. In another example, the user can validate the electronic signature using a trusted third party, such as a certificate validation authority that can be accessed over a network. The user can be notified of the verification status of the electronic signature by the display of validity text or a validity graphic, or both. The validity text and validity graphic are dynamic in that the application can change their appearance depending on the validation of the electronic signature.

Figure 2:
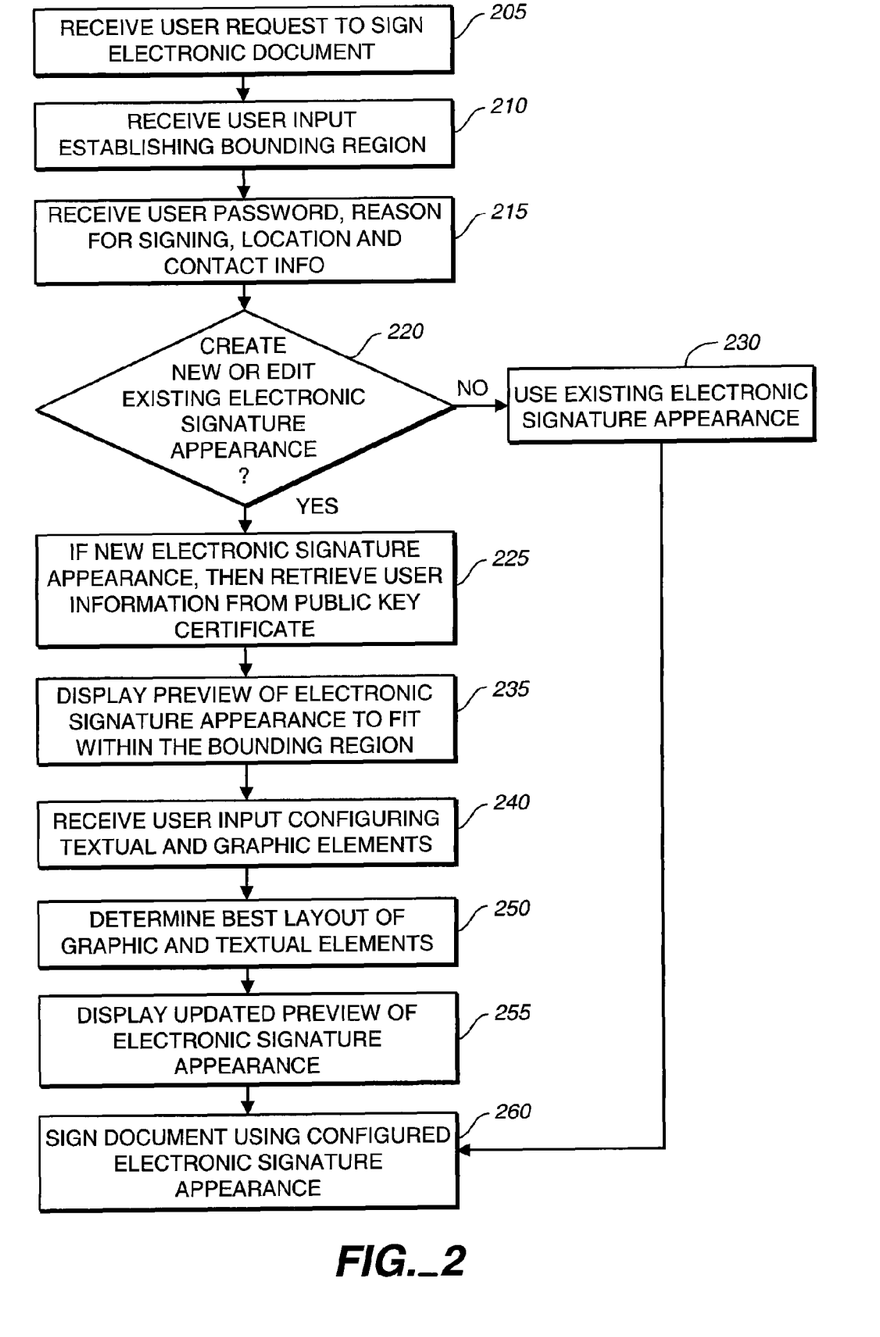
FIG. 2 is a flowchart of a process for creating or editing an electronic signature appearance at the time of signing an electronic document.

A process for signing an electronic document using a configurable electronic signature appearance is shown in FIG. 2. Upon receiving a request by a signer to sign an electronic document (205), the signer is prompted to establish a bounding region on the electronic document (210) if a bounding region has not already been pre-set by an author of the document. The signer can establish the bounding region in any convenient fashion, for example, by holding down the mouse button on the electronic document and dragging out the area in which the signer would like the electronic signature to appear. The signer thereby selects the dimensions and location of the bounding region for the electronic signature appearance on the electronic document.

The signer can be prompted to input information that will form some of the textual elements of the electronic signature appearance, if the signer chooses to include such textual elements. In one implementation, a dialog box is displayed to the signer requesting the signer to provide information, such as, a reason for signing the electronic document, the location of signing and contact information for the signer (215). The signer is also presented with the option of creating a new electronic signature appearance (220), editing an existing electronic signature appearance (220) or using an existing electronic signature appearance (230) to sign the electronic document.

If the signer selects to create an electronic signature appearance, information about the signer contained in a public key certificate corresponding to the signer's private key that will be used to sign an electronic document is retrieved (225). The configuration signature appearance dialog box 100 shown in FIG. 1 is displayed to the signer. A preview of the electronic signature appearance, which can include any available information such as the signer information retrieved from the public key certificate and the location and reason for signing, is displayed within the bounding region (235).

If the signer selects to edit an existing electronic signature appearance, the configuration signature appearance dialog box 100 is displayed to the signer, with a preview of the selected electronic signature appearance displayed within the bounding region (235). In one implementation, the signer can access a list of existing electronic signature appearances through a dialog box and select an electronic signature appearance by highlighting an item on the list. If the user has not previously created an electronic signature appearance, the list will be empty. Alternatively, an author of the electronic document to be signed can include rules that constrain or define the electronic signature appearance with the electronic document. The rules can define whether specific attributes are required in the electronic signature appearance, for example, whether name, date or reason are required to be present in the electronic signature appearance. The user can configure either an existing electronic signature appearance or a new electronic signature appearance interactively. This is done by interacting with checkboxes and buttons displayed within a configure graphic box 136 and a configure text box 152 within the configuration signature appearance dialog box 100.

The configure graphic box 136 displays selections to allow the signer to import a graphic file (240). The signer can select to include either no graphic 138, an imported graphic 140 or the signer's name 142 as the graphic. If the signer selects to import a graphic, the signer can select to import a graphic file, for example a PDF (Adobe® Portable Document Format) file or a file from a portable electronic device, for example, a Palm™ organizer. If the signer selects the Graphic Files button 130, a dialog is shown that allows the signer to select a file as a graphic source from a set of available files. The Palm organizer pop-up 132 allows importing of pictures from a Palm organizer, for example, an image of the signer's handwritten signature. If any Palm files are present they are displayed in the Palm organizer popup 132.

The configure text box 152 displays checkboxes allowing a signer to select textual elements to include in the electronic signature appearance (240). Selecting the name checkbox 154 includes the signer's name in the electronic signature appearance, for example "Fred Smith" 106 as shown in the electronic signature appearance 123. The date checkbox 156 controls the inclusion or exclusion of the date and time that the signer signed the electronic document, for example, as shown in the electronic signature appearance 123 at 114 and 116. The location checkbox 158 controls the inclusion or exclusion of the location at which the signer signed the electronic document in the electronic signature appearance, for example, "Sunnyvale Calif." 120, as shown in the electronic signature appearance 123.

The reason checkbox 160 controls the inclusion or exclusion of the signer's reason for signing the electronic document. In one implementation, the signer is presented with a drop down menu with a list of reasons from which the signer can select a reason or alternatively the signer can input a reason. One example of such as reason is the phrase "This document is ready for approval" 118 displayed as part of the electronic signature appearance 123. The distinguished name checkbox 148 controls the inclusion or exclusion of the signer's distinguished name in the electronic signature appearance: an example of a distinguished name 108 is included in electronic signature appearance 123.

The validity text checkbox 150 controls the inclusion or exclusion of dynamic validity text 128 in the electronic signature appearance. The labels checkbox 144 controls the inclusion or exclusion of text describing the elements included in the electronic signature appearance, such as the following text included in the electronic signature appearance 123: "digitally signed by", "DN", "Date", "Reason" and "Location". If the labels checkbox 144 is not checked, then such descriptive text would not be included in the electronic signature appearance 123. The logo checkbox 146 controls the inclusion or exclusion of a logo displayed in the background of the electronic signature appearance.

If the signer chooses not to configure the textual elements, the textual elements will be set to a predefined default or according to rules defined by the author. For example, the predefined default can be set to include all textual elements.

As the signer selects the graphic and textual elements to include in the electronic signature appearance, an optimal layout of the elements to be included in the electronic signature appearance is determined (250). In one implementation, the optimal layout is determined based on the aspect ratio of the bounding region. For example, if the bounding region is more vertical than horizontal, then the elements are stacked vertically. Conversely, if the bounding region is more horizontal than vertical, then the elements are stacked horizontally.

A preview of the electronic signature appearance 123 is displayed within the bounding region using the determined optimal layout (255). The signature preview is updated whenever one of the selections in the configuration signature appearance dialog box 100 is changed. The preview can be displayed within a window 120 in the configuration signature appearance dialog box 100, as shown in FIG. 1, or in a separate window. Alternatively, the preview of the electronic signature appearance 123 can be displayed on a display of the electronic document to be signed.

If the signer is satisfied with the electronic signature appearance 123, the signer can select to sign the electronic document (260) using the electronic signature appearance 123. Signing an electronic document requires the signer's private key, which is typically protected using some form of security. For example, the signer can be required to enter a user name and password to access the signer's private key to electronically sign a document. Once the signer has signed the electronic document, the electronic signature including the electronic signature appearance 123 is integral to the electronic document, and the electronic signature appearance 123 cannot be modified without invalidating the electronic signature. One reason it is important that the electronic signature appearance 123 become part of the signed electronic document is because the position of the electronic signature appearance 123 relative to other visible elements of the electronic document can have legal or other significance.

If the user selects to use—but not edit—an existing electronic signature appearance (230), then the electronic document will be signed using the selected electronic signature appearance (260).

The signer can archive an electronic signature appearance 123 for later retrieval and use. In one implementation, the signer can enter a title 102 in configuration signature appearance dialog box 100 to identify the electronic signature appearance 123 displayed in the preview pane 122.

Figure 3:
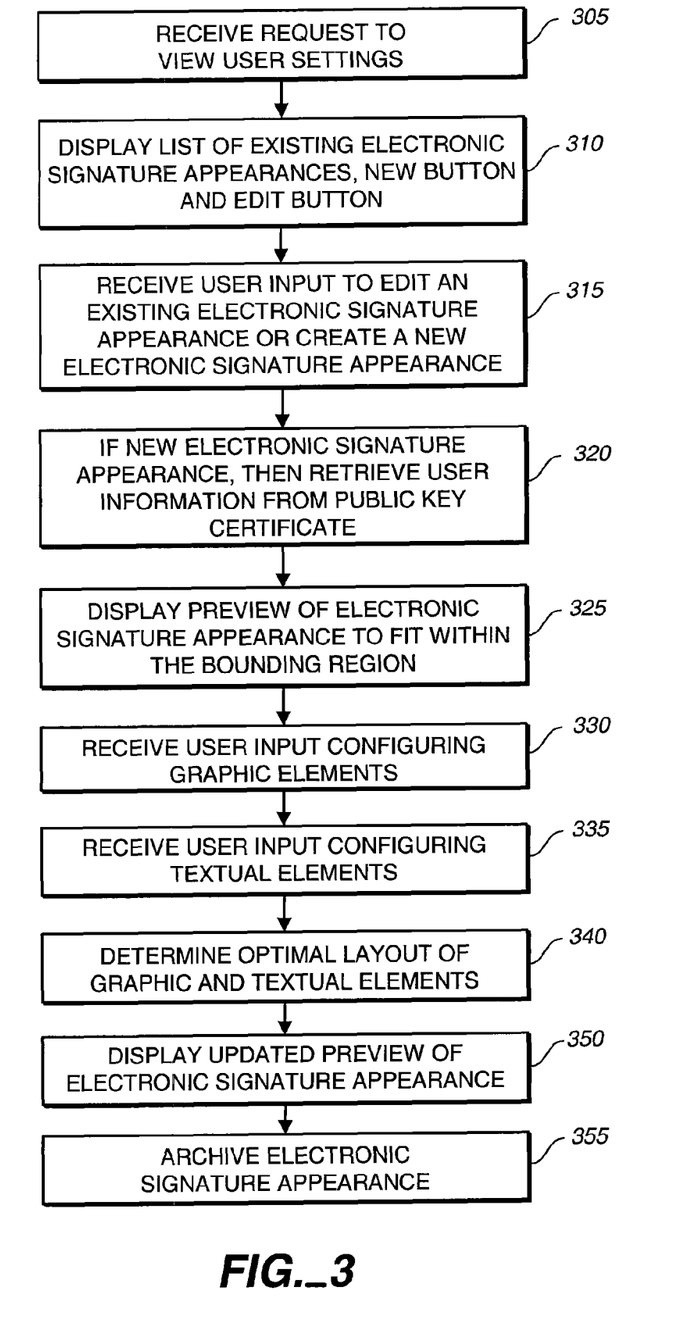
FIG. 3 is a flowchart of a process for creating or editing an electronic signature appearance to archive.

FIG. 3 shows a process for creating and archiving an electronic signature appearance for use at a later time. The process can be executed in an application maintaining security over electronic signature appearances created and archived. For example, the user can be required to authenticate his or herself by entering a user name and secret password, to view the user's settings. The user can then view a list of existing electronic signature appearances and has the option to create a new electronic signature appearance or edit an existing electronic signature appearance is presented to the user. In one implementation, a dialog box is displayed to the user including a list of existing electronic signature appearances, a new button to allow a user to create a new electronic signature appearance, and an edit button to allow a user to edit an existing electronic signature appearance (310). User input is received either selecting the new button or highlighting an item on the list and selecting the edit button (315). If the user selects to create a new electronic signature appearance, information about the user contained in the certificate corresponding to the user's private key is retrieved (320).

The configuration signature appearance dialog box 100 (FIG. 1) is then displayed to the user, including a preview display of the selected existing electronic signature appearance or the new electronic signature appearance including user information retrieved from the certificate corresponding to the user's private key (325). User input is then received configuring the graphic elements (330) and the textual elements (335). As the user selects the graphic and textual elements to include in the electronic signature appearance, the optimal layout of the graphic and textual elements is determined (340) and the preview of the configured electronic signature appearance is updated (345). Once the user is satisfied with the electronic signature appearance, the edited or new electronic signature appearance is stored for later retrieval by the user to sign an electronic document (350).

A separate signature appearance file can be created for each user. In one implementation, a user's electronic signature appearances can be stored in a database. For example, the database could be implemented as a PDF file. The PDF file can have one page for each of the user's existing electronic signature appearances.

In one implementation, an electronic signature appearance has layers arranged so that a dynamic validity graphic indicating the electronic signature is invalid would not be obscured by other elements within the electronic signature appearance, in the event the electronic signature is invalid. An electronic signature appearance can have four standard layers as follows, with the lower numbered layers being painted first:

n0—background layer;

n1—validity layer for presentation of a dynamic validity graphic, for example, a question mark for validity unknown and a checkmark for valid;

n2—static graphic and textual elements; and n3—validity layer for presentation of an invalidity graphic. This layer is above n2 so that the invalidity graphic (e.g., an "X") cannot be hidden by layer n2. If the electronic signature is valid, this layer is blank.

An additional, optional layer is n4, a text layer for presentation of the dynamic validity text, for example, "Signature is valid", "Validity Unknown" or "Signature is Invalid". Default values for the layers are stored in an electronic document signed using the electronic signature appearance. For example, the default value for n1 can be a question mark and the default value for n4 can be "Validity Unknown". When the electronic signature is validated, then the electronic signature appearance dynamically changes to reflect the validation, and n1 becomes a check mark and n4 becomes "Signature is valid", for example.

The invention can implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method to sign an electronic document, the method comprising:
   at the time of electronically signing an electronic document, receiving a first input selecting an existing electronic signature appearance, where the electronic signature appearance comprises a visual manifestation of a signature on the electronic document and includes at least one of graphical or textual elements;
   providing a preview of the electronic signature appearance in a bounding region, where the bounding region is a region on the electronic document where the electronic signature appearance will appear;
   receiving a second input editing the selected electronic signature appearance while previewing the selected electronic signature appearance and before electronically signing the electronic document and providing a preview of the edited electronic signature appearance in the bounding region; and
   receiving a third input signing the electronic document with an electronic signature, the edited electronic signature appearance being included in the electronic document signed with the electronic signature, where the electronic signature comprises code derived from the signed electronic document and a private key.

2. The method of claim 1, further comprising:
   interacting with a user to establish the bounding region on the electronic document.

3. The method of claim 1, wherein the bounding region is pre-set in the electronic document by an author of the electronic document.

4. The method of claim 1, wherein the electronic signature appearance includes a plurality of layers including a first validity layer for presentation of a dynamic validity graphic, an appearance layer for presentation of the visual manifestation of the signature, and a second validity layer above the first validity layer for presentation of an invalidity graphic.

5. The method of claim 1, wherein receiving the second input editing the selected electronic signature appearance comprises:
   receiving user input activating controls for controlling textual and graphic elements included in the electronic signature appearance.

6. The method of claim 5, wherein providing a preview of the electronic signature appearance includes providing a display in a configuration dialog box of the electronic signature appearance within the bounding region and the controls for controlling textual and graphic elements.

7. The method of claim 1, wherein providing a preview of the electronic signature appearance includes displaying the electronic signature appearance within the bounding region on a display of the electronic document.

8. The method of claim 1, further comprising:
   determining an optimal layout of the electronic signature appearance based on the dimensions of the bounding region.

9. The method of claim 1, further comprising:
   determining optimal dimensions of the bounding region based on the electronic signature appearance.

10. A computer readable medium encoded with a computer program product comprising instructions operable to cause a programmable processor to:
- at a time of electronically signing an electronic document, receive a first input selecting an existing electronic signature appearance, where the electronic signature appearance comprises a visual manifestation of a signature on the electronic document and includes at least one of graphical or textual elements;
- provide a preview of the electronic signature appearance in a bounding region, where the bounding region is a region on the electronic document where the electronic signature appearance will appear;
- receive a second input editing the selected electronic signature appearance while previewing the selected electronic signature appearance and before electronically signing the electronic document and provide a preview of the edited electronic signature appearance in the bounding region; and
- receive a third input signing the electronic document with an electronic signature, the edited electronic signature appearance being included in the electronic document signed with the electronic signature, where the electronic signature comprises code derived from the signed electronic document and a private key.

11. The computer-readable medium of claim 10, where the computer program product further comprises instructions operable to cause a programmable processor to:
- interact with a user to establish the bounding region on the electronic document.

12. The computer-readable medium of claim 10, wherein the bounding region is pre-set in the electronic document by an author of the electronic document.

13. The computer-readable medium of claim 10, wherein the electronic signature appearance includes a plurality of layers including a first validity layer for presentation of a dynamic validity graphic, an appearance layer for presentation of the visual manifestation of the signature, and a second validity layer above the first validity layer for presentation of an invalidity graphic.

14. The computer-readable medium of claim 10, wherein instructions operable to cause a programmable processor to receive the second input editing the selected electronic signature appearance comprise instructions operable to cause a programmable processor to:
- receive user input activating controls for controlling textual and graphic elements included in the electronic signature appearance.

15. The computer-readable medium of claim 14, wherein instructions operable to cause a programmable processor to provide a preview of the electronic signature appearance include instructions operable to cause a programmable processor to:
- provide a display in a configuration dialog box of the electronic signature appearance within the bounding region and the controls for controlling textual and graphic elements.

16. The computer-readable medium of claim 10, wherein instructions operable to cause a programmable processor to provide a preview of the electronic signature appearance include wherein instructions operable to cause a programmable processor to:
- display the electronic signature appearance within the bounding region on a display of the electronic document.

17. The computer-readable medium of claim 10, where the computer program product further comprises instructions operable to cause a programmable processor to:
- determine an optimal layout of the electronic signature appearance based on the dimensions of the bounding region.

18. The computer-readable medium of claim 10, where the computer program product further comprises instructions operable to cause a programmable processor to:
- determine optimal dimensions of the bounding region based on the electronic signature appearance.

19. The computer-readable medium of claim 10, wherein, prior to validation of the electronic signature, a default validity graphic is presented in the first validity layer and if the electronic signature is validated then the electronic signature appearance dynamically changes to present a validity graphic in the first validity layer reflecting the validation and if the electronic signature is invalidated, then the electronic signature appearance dynamically changes to present an invalidity graphic in the second validity layer reflecting the invalidation.

20. A system comprising:
- a processor;
- a storage device coupled to the processor and configurable for storing instructions, which, when executed by the processor, cause the processor to perform operations comprising:
  - at a time of electronically signing an electronic document, receiving a first input selecting an existing electronic signature appearance, where the electronic signature appearance comprises a visual manifestation of a signature on the electronic document and includes at least one of graphical or textual elements;
  - providing a preview of the electronic signature appearance in a bounding region, where the bounding region is a region on the electronic document where the electronic signature appearance will appear;
  - receiving a second input editing the selected electronic signature appearance while previewing the selected electronic signature appearance and before electronically signing the electronic document and provide a preview of the edited electronic signature appearance in the bounding region; and
  - receiving a third input signing the electronic document with an electronic signature, the edited electronic signature appearance being included in the electronic document signed with the electronic signature, where the electronic signature comprises code derived from the signed electronic document and a private key.

21. The system of claim 20, wherein the storage device coupled is further configurable for storing instructions, which, when executed by the processor, cause the processor to perform operations comprising:
- interacting with a user to establish the bounding region on the electronic document.

22. The system of claim 20, wherein the bounding region is pre-set in the electronic document by an author of the electronic document.

23. The system of claim 20, wherein the electronic signature appearance includes a plurality of layers including a first validity layer for presentation of a dynamic validity graphic, an appearance layer for presentation of the visual manifestation of the signature, and a second validity layer above the first validity layer for presentation of an invalidity graphic.

24. The system of claim 20, wherein instructions, which, when executed by the processor, cause the processor to receive the second input editing the selected electronic signature appearance comprise instructions operable to cause the processor to perform operations comprising:

receiving user input activating controls for controlling textual and graphic elements included in the electronic signature appearance.

25. The system of claim 24, wherein instructions, which, when executed by the processor, cause the processor to provide a preview of the electronic signature appearance comprise instructions operable to cause the processor to perform operations comprising:

providing a display in a configuration dialog box of the electronic signature appearance within the bounding region and the controls for controlling textual and graphic elements.

26. The system of claim 20, wherein instructions, which, when executed by the processor, cause the processor to provide a preview of the electronic signature appearance comprise instructions operable to cause the processor to perform operations comprising:

displaying the electronic signature appearance within the bounding region on a display of the electronic document.

27. The system of claim 20, wherein the storage device coupled is further configurable for storing instructions, which, when executed by the processor, cause the processor to perform operations comprising:

determining an optimal layout of the electronic signature appearance based on the dimensions of the bounding region.

28. The system of claim 20, wherein the storage device coupled is further configurable for storing instructions, which, when executed by the processor, cause the processor to perform operations comprising:

determining optimal dimensions of the bounding region based on the electronic signature appearance.

29. The system of claim 20, wherein, prior to validation of the electronic signature, a default validity graphic is presented in the first validity layer and if the electronic signature is validated then the electronic signature appearance dynamically changes to present a validity graphic in the first validity layer reflecting the validation and if the electronic signature is invalidated, then the electronic signature appearance dynamically changes to present an invalidity graphic in the second validity layer reflecting the invalidation.

\* \* \* \* \*